United States Patent [19]

Kamlukin

[11] Patent Number: 5,472,387
[45] Date of Patent: Dec. 5, 1995

[54] SELF ALIGNING PLANETARY GEAR TRANSMISSIONS

[76] Inventor: Igor Kamlukin, 22506 N. Shorecliff La., Mequon, Wis. 53092

[21] Appl. No.: 253,903

[22] Filed: Jun. 3, 1994

[51] Int. Cl.⁶ ........................................................ F16H 1/28
[52] U.S. Cl. .......................... 475/338; 475/339; 475/346
[58] Field of Search ..................................... 475/331, 334, 475/338, 339, 346

[56] References Cited

U.S. PATENT DOCUMENTS

| | | | |
|---|---|---|---|
| 2,901,925 | 9/1959 | Gunderson et al. | 475/331 X |
| 3,780,601 | 12/1973 | Dach et al. | 475/331 X |
| 3,943,780 | 3/1976 | Klaue | 475/346 X |
| 4,178,813 | 12/1979 | Smemo | 475/54 |
| 4,468,063 | 8/1984 | Yukimoto et al. | 475/153 X |
| 5,195,389 | 3/1993 | Isozumi | 475/331 X |
| 5,328,419 | 7/1994 | Motl et al. | 475/338 X |

FOREIGN PATENT DOCUMENTS

| | | | |
|---|---|---|---|
| 364954 | 10/1962 | Switzerland | 475/7 |

Primary Examiner—Charles A. Marmor
Assistant Examiner—Peter Kwon
Attorney, Agent, or Firm—Robert B. Benson

[57] ABSTRACT

This invention relates to high reduction planetary transmissions that do not use ring gears and particularly planet gears that are the support for the planet carrier. The planet carrier is entirely supported by the planet gears meshing with their respective sun and output gears. The planet gears can move in a radial direction to improve tooth alignment between the meshing gears and equalize the distribution of the torque load between the planet gears. In some cases the planet carrier may act as one of the support bearings for the input shaft.

5 Claims, 5 Drawing Sheets

SELF ALIGNING PLANETARY GEAR TRANSMISSIONS

BACKGROUND OF THE INVENTION

This invention relates to a differential power transmission often referred to as a planetary transmission of the type where the planetary gears radially outward movement is restrained by a planet carrier rather than a ring gear formed within the transmission housing. In general, such transmissions comprise rotatable shafts mounted in axial alignment with one being power driven and the other an output shaft. It also includes planetary shafts radially spaced from the input shaft and driven by a carrier attached to the input power shaft. Gears or pinions are mounted on the planetary shafts and positioned to mesh with a stationary sun gear and a gear mounted on the output shaft. Such transmissions are capable of producing speed differentials of up to 300 to 1.

Because of high output loads and high rotational speeds of the planet carrier assembly in planetary transmissions of the type described above, gears must be very carefully designed, manufactured and assembled. It is essential that the planet gears be accurately positioned at all times to equally distribute the internal tooth loads. Normal design practice would require the planet carrier rotate around a fixed center on the centerline of the output shaft. This invention proposes that the carrier find its own rotational center by being supported by its planet gears as they roll around their respective sun and output gears, the planet gears under load will seek their own operating centers and thus insure equal tooth loading. Whether the planet carrier employs two or three sets of planets the carrier will always retain in its proper spacing due to the planet gears in mesh with their associated sun and output gears. To allow the planet assembly freedom to find its own rolling center, it must not be restrained by torque transmission from the input shaft supported by its own bearings. The input torque must be transmitted through a flexible coupling. However in designs that integrate the driving means with the transmission means, the flexible coupling may be eliminated by using the planet carrier assembly as one of the drive shaft supporting bearings. The pinions gears rolling around the stationary and output gears would be the equivalent of balls in a ball bearing.

Attempts have been made in the prior art to make some of the gears in a planetary transmission float to enable them to more accurately align with intermeshing gears. Such attempts include the use of floating sun gears that move radially relative to the planet gears and cradles in the outer surface of the carrier which drive the planet shaft but enable the shafts to move radially relative to the carrier and the stationary and output gears. However, most of these attempts were associated with transmissions using ring gears. Although both of these methods allow some radial movement between the planet gears and the stationary and output gears, neither has satisfactorily solved the alignment and load distribution problems between the intermeshing gears especially those that do not use ring gears to retain the planet gears.

This invention overcomes the problems in the prior art by providing a means whereby the planet carrier can move in a radial direction thus enabling the planet gears to self align themselves with the gear they engage. This results in a more accurate alignment between the gears which enables the planetary gears to equally share the load being transmitted. This invention will reduce the cost of manufacturing planetary transmissions of the type described by broadening manufacturing gear tolerances, angular pinion gear spacing tolerance, as well as the center distances between the planet pinions and their mating gears.

OBJECTIVES OF INVENTION

The object of this invention is to provide a new and improved planetary gear transmission.

Another object of the inventions is to provide a planetary gear transmission that is easier to manufacture and assemble because it does not require the exact tolerances that other planetary gear transmission require.

Another object of the invention is to provide a new and improved planetary gear transmission where the planet gears are self aligning with the stationary gear and the output gear to and equalize the distribution of the load between the gears.

Another object of the invention is to provide a new and improved planetary gear transmission in which the planet carrier and associated gears function as a bearing for the drive shaft.

Figure 1:
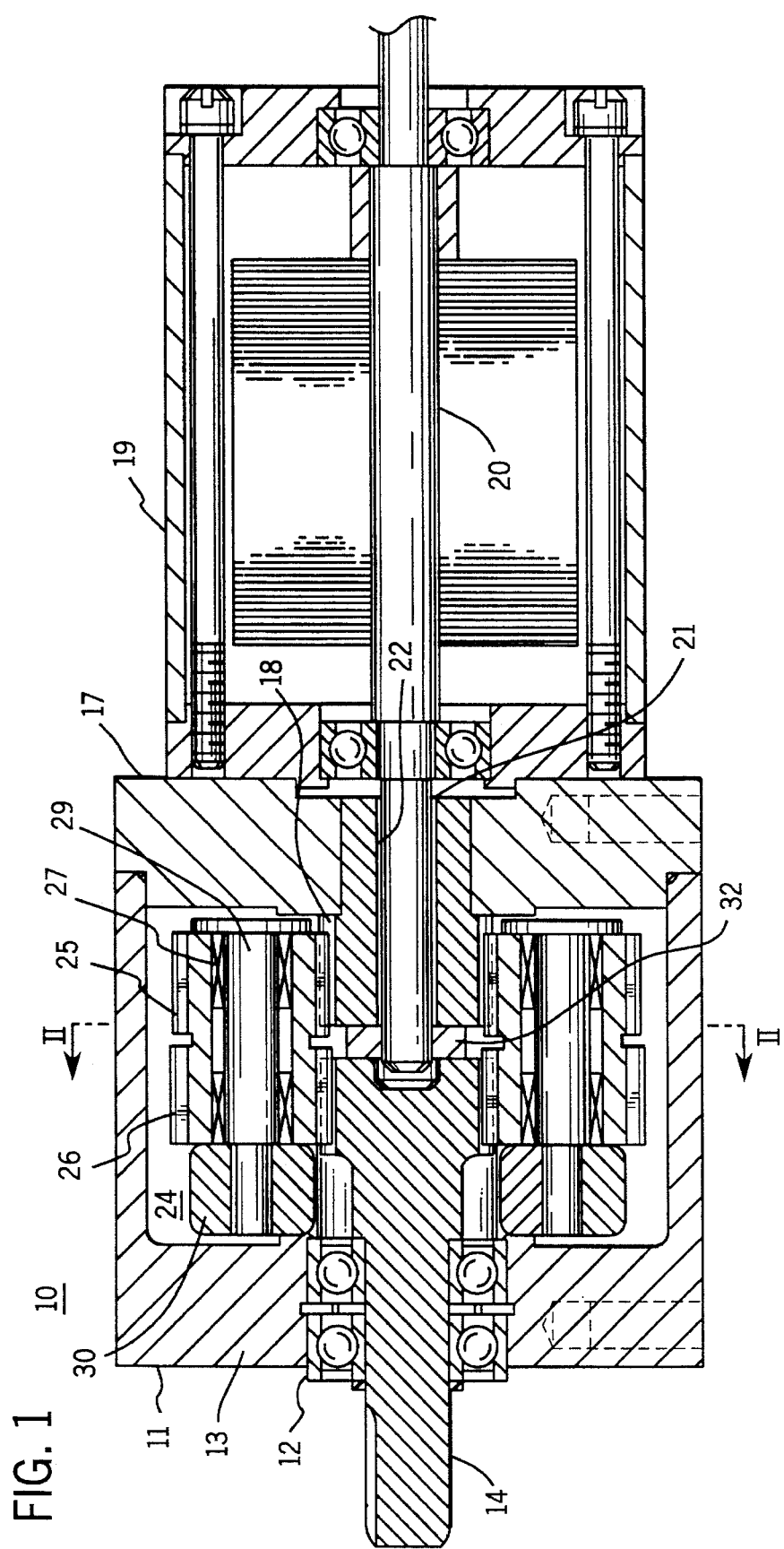
FIG. 1 is longitudinal sectional on an axial vertical plane through a planetary gear transmission embodying the present invention and showing portions of the input and output shafts associated therewith.
Figure 2:
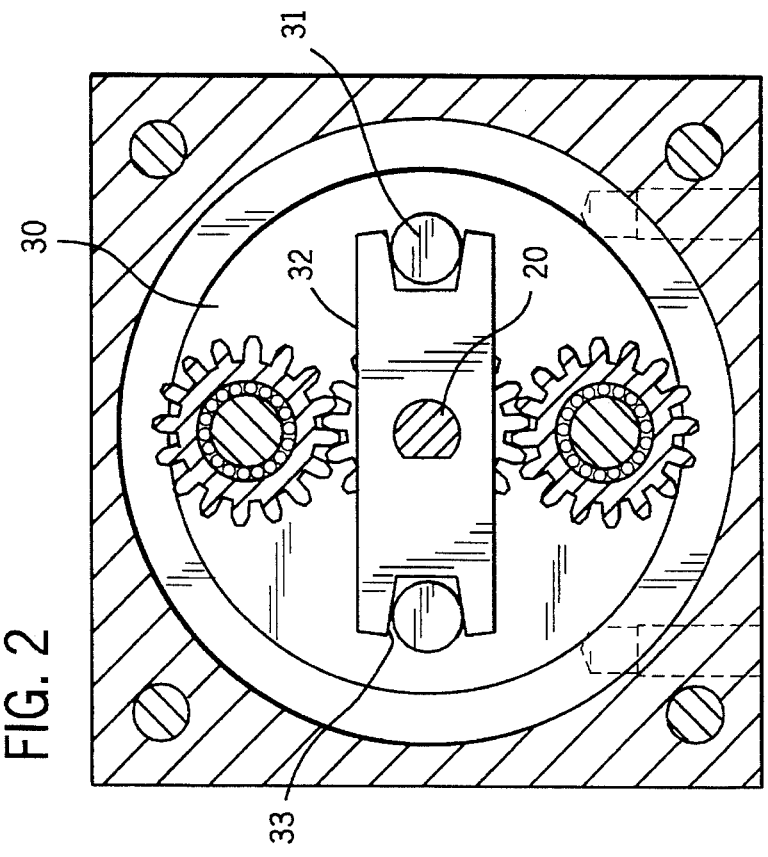
FIG. 2 is a cross section view taken along the line II—II of FIG. 1.

In the preferred embodiment of this invention, as shown in FIGS. 1 and 2, a transmission housing 10 consists of cup shaped member 11 having a bearing 12 mounted in wall 13 for supporting an output shaft 14 on which is mounted an output gear 15. The output gear is positioned within the cup shaped member 11. A disk shaped cover 17 is positioned to connect with member 11 forming an enclosure to house the planet gear transmission. A sun gear 18 is attached to the inside of cover 17. The cover 17 also functions as a support for a power source such as an electric motor 19 whose drive shaft 20 extends through an opening 21 the cover and a bore 22 in the sun gear 18 in alignment with output shaft 14.

A planetary assembly 24 consists of planet gears or pinions 25 and 26 which are connected together for rotation on bearings 27—27 around planet shafts 29 supported by a planet carrier 30. Planet gear 25 is positioned to mesh with sun gear 18 and planet gear 26 is positioned to mesh with output gear 15. The planet carrier also supports drive pins 31 which extend therefrom and are loosely engaged by a drive plate 32 which slip fits and is keyed to the inner end of the drive shaft 20 to rotate with the drive shaft.

The drive plate 32 is positioned between the sun gear 18 and the output gear 15 and extends radially from the drive shaft and has openings shown as slots 33 near its periphery that fit over and engage the drive pins extending from carrier 30. This enables the carrier 30 to slide radially relative to the drive plate in response to forces on the planet gears as they rotate around the sun 18 and output 15 gears.

In final assembly drive plate 32 engages the end of drive shaft 20 and the carrier drive pins 31 fit into opening 33. The planet carrier 30 is moved to engage the planet gears 25 with the sun gear 18. Cup shaped housing member 11 is moved to engage the output gear 15 with its planet gears 26. The cup shaped member 11 connects with the cover 11 to complete the housing 10.

Planetary assembly 24 is supported by the planet gears 25 and 26 meshing with output 11 and sun gears 15,18. As the planet carrier assembly 24 is rotated by the drive plate 32, the planet gears 25, 26 seek their center of rotation to equalize the torque load from the drive plate 32. The center of rotation of the planet carrier assembly 24 may not exactly coincide with the center line of the drive shaft 29 but the drive plate 32 will compensate for the difference because it is free to slide radially relative to drive pins 31 attached to the carrier 30.

In operation the motor 19 rotates the drive shaft 20. The drive plate 32 which is connected to the drive shaft rotates with the shaft and engages the carrier pins 31 to rotate the planet carrier 30. The planet shafts 29 are connected to the carrier 30 and rotate with the carrier and drive the planet gears 25, 26 in a circular orbit around the center line of the drive shaft. The planet gear 25 engages the sun gear 18 and rotates around that gear. The second planet gear 26 is connected to the first planet gear 25 and rotates therewith. The second planet gear 26 has a different number of teeth than the first planet gear and, therefore, when it engages the output gear it drives the output gear at a different speed then the first planet gear.

The gear reduction ratios are the result of rolling the planet carrier assembly 24 around the sun 18 and output 15 gears. Transmissions using this principle can be designed for very high reduction rations of 300 to 1 or even more. To understand how the speed reduction is computed, assume the output gear has 11 teeth, its mating planet gear 10 teeth, the stationary sun gear 12 teeth, and its mating planet gear 11 teeth. To determine the reduction ration, assume the entire gear box and gear train is rotated on revolution clockwise. That means the output shaft and input shaft were also turned 1 revolution clockwise, Now turning the stationary sun gear backward (counter clockwise) 1 revolution returns the sun gear to it original fixed position, and at the same time turns the two planet gears 12/11 revolution clockwise. The output planet gear in turn, turns the output gear and its shaft counter clockwise 12/11×10/11 revolutions. This equals 0.991735 counter clockwise revolutions of the output shaft. The net output revolution is 1.000000–0.991735–0.0082 revolution for 1 revolution of input shaft rotation, or a reduction ration of 121.992.

Although the above described planetary drive has only two planet sets of gears, the invention equally applies to planetary drives in which the planet carrier has three or more planet sets that are equally arcuately spared around the carrier.

Figure 4:
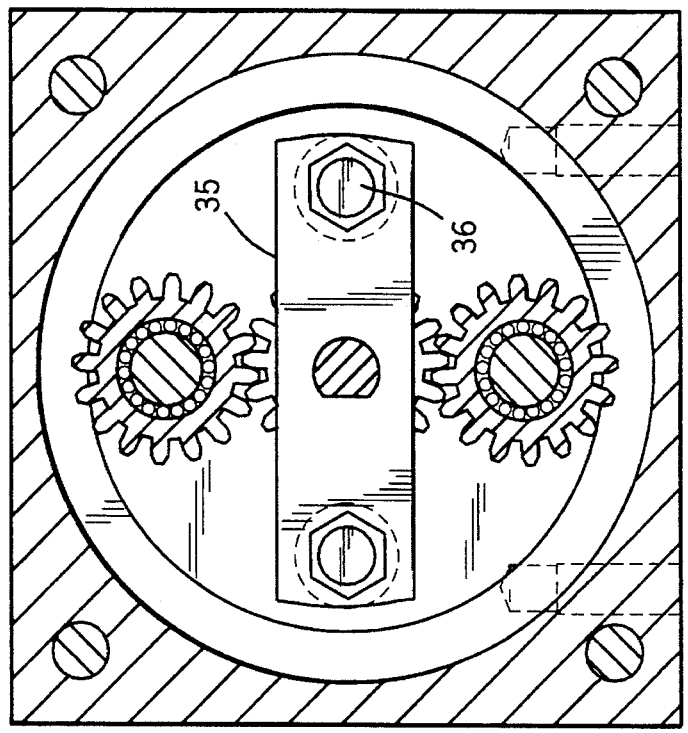
FIG. 4 is a cross sectional view taken along the lines IV—IV of FIG. 3.
Figure 3:
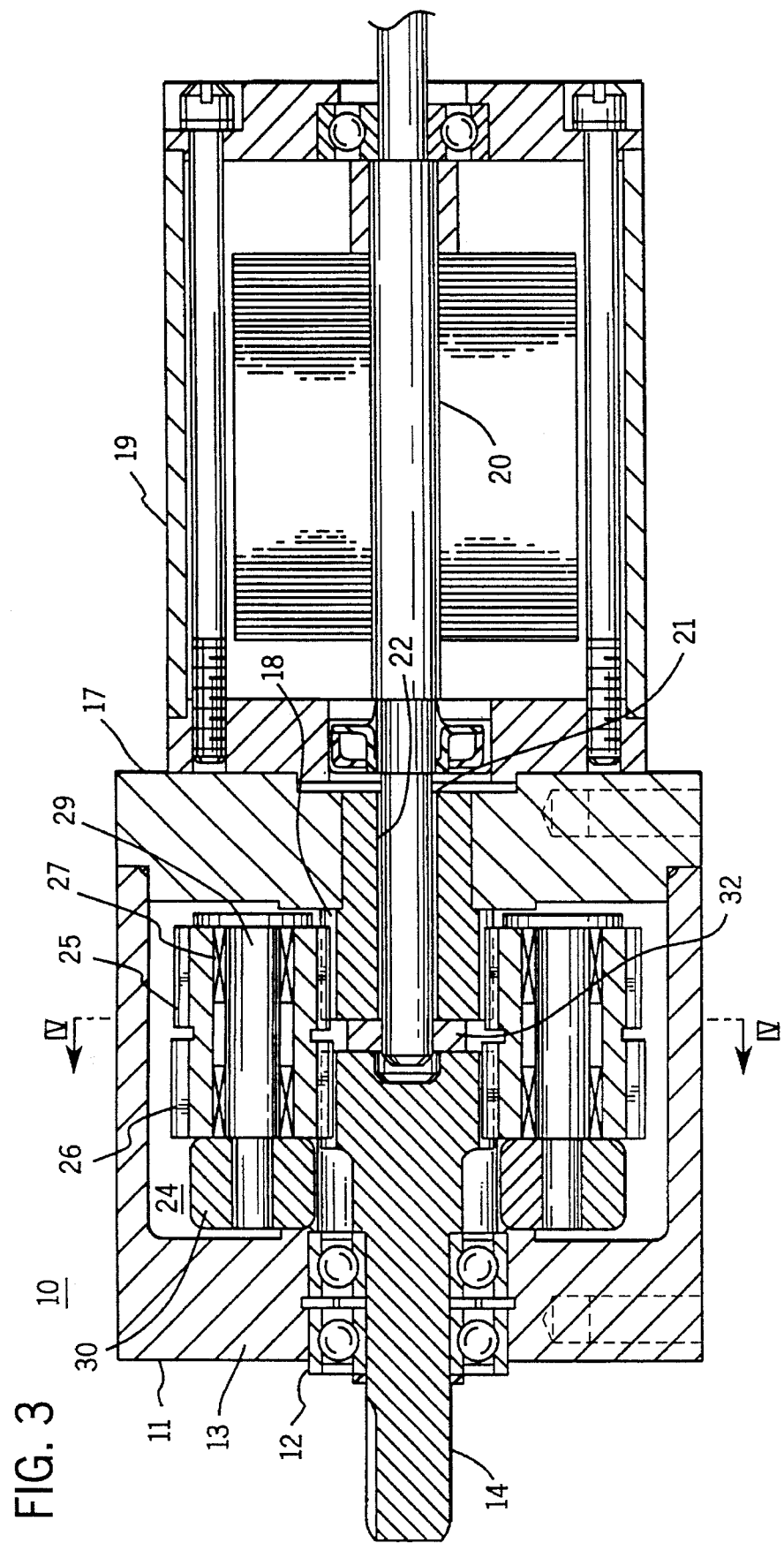
FIG. 3 is a longitudinal sectionally view on a axial vertical plane through a transmission of this invention showing an alternate way of transmitting torque from the drive shaft to the planet carriers.

An additional method of rotating the planet carrier assembly and still allowing it to find its own rotating center would be to drive it with a drive shaft that uses the planet carrier assemblies as one of its two supporting bearings. Such an application is shown in FIGS. 3 and 4 in which the same reference numbers are used to identify identical parts shown in FIGS. 1 and 2. In this case, the drive plate 35 is rigidly attached to the carrier by bolts 36 and keyed to the drive shaft. The planet gears rolling around their mating sun and output gears are the equivalent of balls in a ball bearing. Thus the radial movement of the drive shaft to enable the planet gears to align and distribute the load is accomplished by using the planet carrier assembly as the second bearing for the drive shaft.

Figure 5:
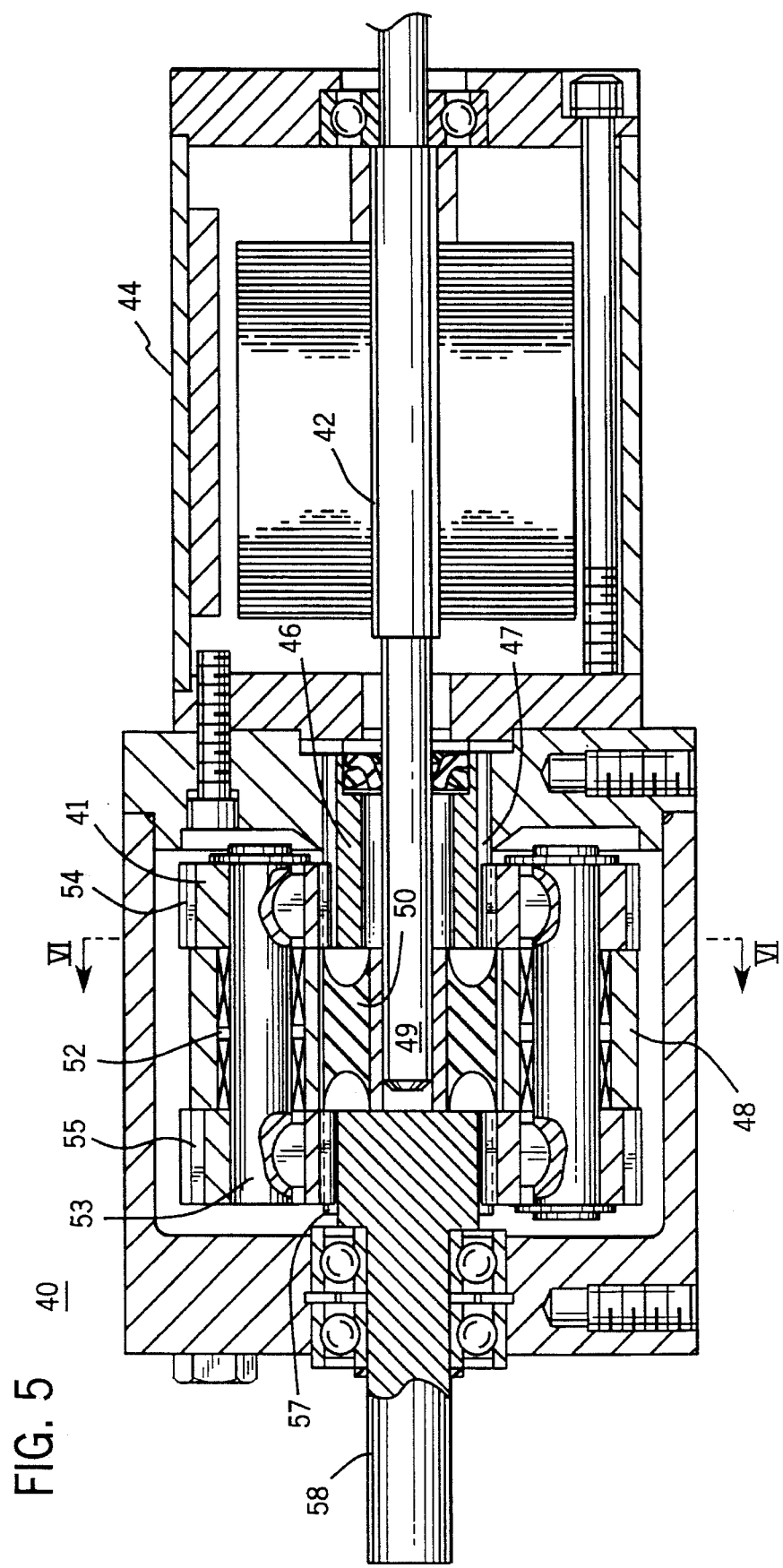
FIG. 5 is a longitudinal sectional view on an axial vertical plane through an alternate planetary transmission of this invention using a resilient connection between the drive shaft and the planet carrier.
Figure 6:
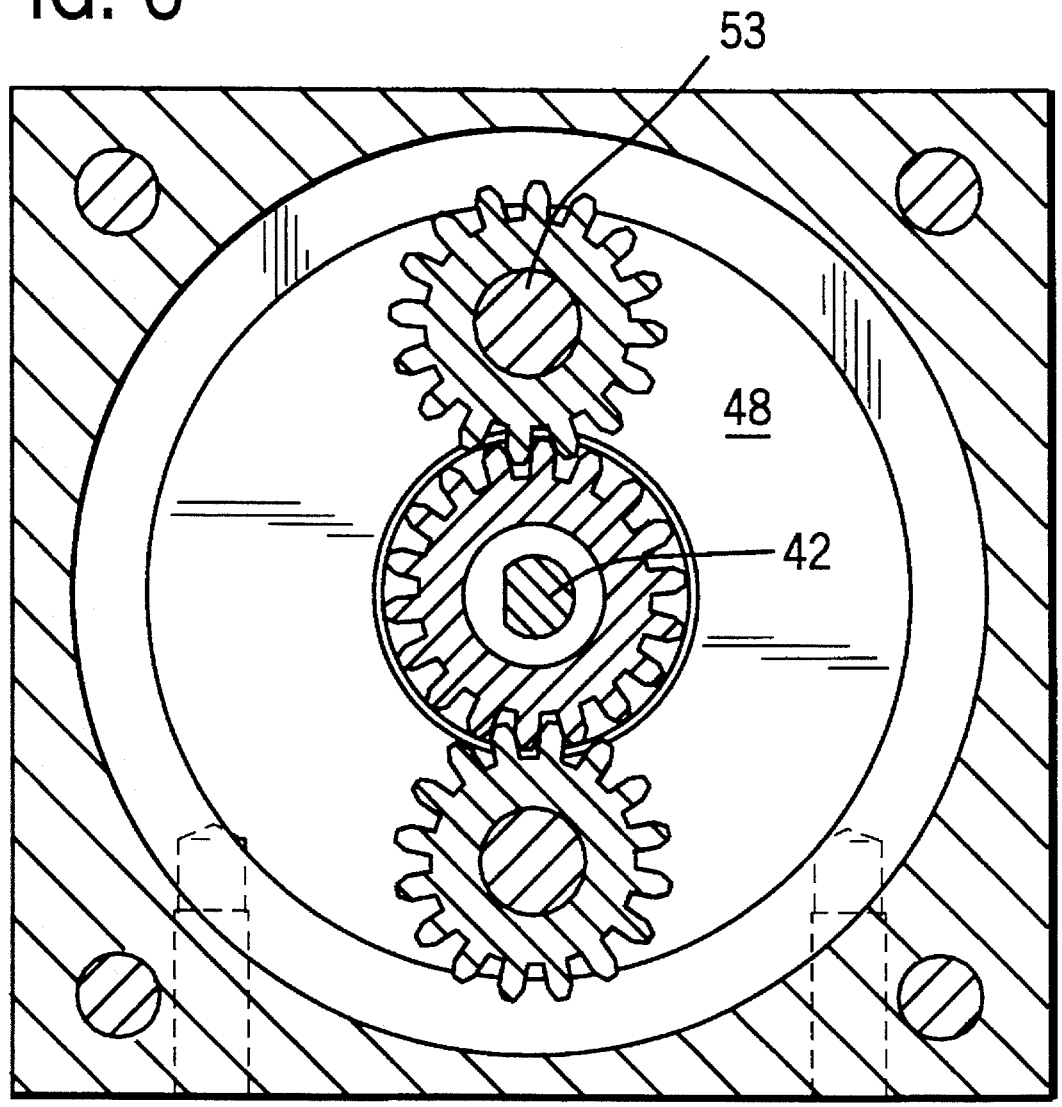
FIG. 6 is a cross section view taken along the line V—V of FIG. 5.

An alternative embodiment of the invention is shown in FIGS. 5 and 6. In that embodiment a housing 40 encloses the transmission 41. An input or drive shaft 42 extends into the housing 40. The drive shaft 42 is connected to an appropriate power source shown as motor 44.

A stationary sun gear 46 having external 47 teeth surrounds the drive shaft 42 and is mounted on the housing 40 to be stationary relative to the input shaft. A planetary carrier 48 is attached to the inner end 49 of the drive shaft 42 for rotation therewith by a resilient coupling 50. The carrier 48 is shown as a disk. Holes or bores 52 are formed near the outer periphery of the carrier 48 for receiving planetary shafts 53 which are free to rotate within said bores. The bores 52 are equally, arcuately spaced near the periphery of the carrier. In the preferred embodiment the bores are 180° apart.

A first planet gear 54 is mounted on one end of each of the planetary shafts 53 for rotation therewith and is positioned to mesh with the stationary sun gear 46.

Second planet gears 55 are mounted on the other end of each of the planet shafts 53 for rotation therewith and positioned to mesh with an output gear 57 mounted on the output shaft 58 which extends through the housing 40 and is axially aligned with the drive shaft 42. The output shaft 58 may be attached to any device that needs to be driven by the planetary transmission.

To enable the planet gears 54 and 55 to move radially and align themselves with the stationary and output gears 41 and 57, the inner end of the drive shaft is connected to the carrier 48 by a resilient coupling 50 which allows relative radial movement between the carrier 48 and the drive shaft 42 while still being rigid enough to transmit the torque from the drive shaft to the carrier.

In operation, the planet carrier 48 is rotated by the drive shaft 42 and the planet shafts 53 move with the carrier 48 around the drive shaft centerline. The first planet gears 54 mesh with the stationary gear 46 as they rotate with the carrier and thereby impart rotary movement to the planetary shafts 53. The planetary shafts 53 rotate the second planetary gears 55 which mesh with and drive the output gear 57. The output gear 57 in turn rotates the output shaft 26 to which it is attached.

Since the carrier 48 is flexibly connected to the drive shaft, it can move radially in response to the forces exerted by the planet gears as they move to find the best mesh with their corresponding sun and output gears 46,57. Thus the load being transmitted between the planetary gears and the stationary gear 15 and the output gear 25 is automatically balanced.

The operation of the planetary transmission shown in FIG. 5 is essentially the same as described in connection with the preferred embodiment shown in FIGS. 1 and 2 except that the radial movement of the carrier in response to the forces imposed by the planet gears is made possible by a flexible coupling between the carrier 48 and the drive shaft 42 rather than a sliding fit as shown in FIG. 2.

Although the a planetary drive shown in FIG. 5 has only two planetary shafts and associate gears, it equally applies to planetary drives in which the planet carrier has three planetary shafts.

An additional method of providing the planet carrier with room to find its own rotating center would be to provide radial clearance in the bearing for the input shaft closest to the planet carrier. Such a clearance would make the planet carrier one of the main supports for the drive shaft. The amount of clearance would be determined by the diametrical pitch of the gears used in the transmission but should be such that the planet gears are allowed to move radially sufficiently to share the torque load at the sun and output gears.

The embodiments of the invention in which an exclusive property or privilege is claimed are defined as follows:

1. a planetary power transmission comprising;

a stationary housing;

a drive shaft extending into said housing;

a stationary gear having external teeth surrounding said drive shaft and fixed to said housing;

an output shaft extending into said housing opposite to and axially aligned with said input shaft;

an output gear mounted on said output shaft;

a planet carrier having at least two equally arcuately spaced planet shafts extending therefrom; first planet gears rotatably mounted on said planet shafts and positioned to mesh with said stationary gear;

second planetary gears rotatably mounted on said planetary shaft and positioned to mesh with said output gear;

said planetary gears being coupled to rotate together;

a radially extending drive plate mounted on the inward end of said drive shaft for rotation therewith and having openings near its radially outward ends;

pins attached to said carrier and extending into said openings in said drive plate to rotate said carrier with said drive shaft, said pins being in a loose fitting relationship with said drive plate to allow radial movement of said pins and said carrier relative to said drive plate.

2. the transmission of claim 1 in which the openings in said drive plate are U shaped.

3. a planetary power transmission comprising;

a stationary housing;

drive shaft extending into said housing;

a stationary gear having external teeth surrounding said shaft and fixed to said housing;

an output shaft extending into said housing opposite to and axially aligned with said input shaft;

a radially extending planet carrier surrounding the end of said input shaft within said housing, said carrier having at least two equally arcuately spaced bores formed near the outer periphery of said carrier;

planet shafts mounted in said bores;

first planet gears mounted for rotation on said planet shafts and meshing with said stationary gear;

an output gear mounted on said output shaft for rotations therewith;

second planetary gears mounted for rotation on said planet shafts and positioned to mesh with said output gear;

said input shaft being connected to said carrier by a flexible coupling to drive said carrier and enable the carrier to move in a radial direction and thereby enable said planet gears to align themselves with said input and output gears to uniformly distribute the load from said drive shaft.

4. A planetary transmission of claim 3 in which said carrier is positioned between said first and second planetary gears.

5. a planetary power transmission comprising;

a stationary housing;

a drive shaft extending into said housing; supported on a single bearing;

a stationary gear having external teeth surrounding said drive shaft and fixed to said housing;

an output shaft extending into said housing opposite to and axially aligned with said input shaft;

an output gear mounted on said output shaft;

a planet carrier having at least two equally arcuately spaced planet shafts extending therefrom;

first planet gears rotatably mounted on said planet shaft and positioned to mesh with said stationary gear;

second planetary gears mounted on said planetary shaft and positioned to mesh with said output gear;

said planetary gears being coupled to rotate together;

a radially extending drive plate mounted on the inward end of said drive shaft for rotation therewith;

bolts attaching said carrier to said drive plate to rotate said carrier with said drive shaft;

said carrier and planet gears functioning as a second bearing for said drive shaft.

\* \* \* \* \*